United States Patent [19]

Boileau et al.

[11] 4,254,247

[45] Mar. 3, 1981

[54] NOVEL INITIATORS FOR ANIONIC POLYMERIZATION

[75] Inventors: Sylvie L. Boileau, Paris; Paul J. Caubere, Nancy; Serge L. Lecolier, Janville sur Juine; Serge F. Raynal, Villejuif, all of France

[73] Assignee: Societe Nationale des Poudres et Explosifs, Paris, France

[21] Appl. No.: 800,036

[22] Filed: May 24, 1977

[30] Foreign Application Priority Data

May 26, 1976 [GB] United Kingdom ............... 21861/76
Dec. 15, 1976 [GB] United Kingdom ............... 52387/76

[51] Int. Cl.$^3$ .................. C08F 4/46; C08G 63/10; C08F 4/08
[52] U.S. Cl. .................. 526/180; 526/178; 526/194; 526/204; 526/208; 526/209; 526/210; 526/211; 526/212; 526/265; 526/293; 526/314; 526/328; 526/335; 526/346; 526/352
[58] Field of Search ............... 526/180, 178, 346, 352, 526/328, 293, 336, 314, 335, 265, 210, 212, 204, 211, 209

[56] References Cited

U.S. PATENT DOCUMENTS

| 2,181,771 | 11/1939 | Scott | 525/346 |
|---|---|---|---|
| 2,327,082 | 8/1943 | Walker | 526/346 |
| 2,849,432 | 8/1958 | Kibler et al. | 260/879 |
| 3,240,772 | 3/1966 | Natta et al. | 526/180 |
| 3,609,129 | 9/1971 | Krasulina et al. | 526/211 |
| 3,935,177 | 1/1976 | Muller et al. | 526/180 |

FOREIGN PATENT DOCUMENTS

| 2449784 | 4/1976 | Fed. Rep. of Germany | 526/180 |
|---|---|---|---|
| 1426747 | 3/1976 | United Kingdom | 526/180 |

OTHER PUBLICATIONS

Chem. Abs., vol. 81 (1974), 119287m, Caubere, Paul.
Chem. Abs., vol. 87, (1977), 84412t, Brunet, J. J.

Primary Examiner—Joseph L. Schofer
Assistant Examiner—Herbert J. Lilling
Attorney, Agent, or Firm—Bucknam and Archer

[57] ABSTRACT

An initiator for the anionic polymerization of vinyl monomers and dienic monomers comprises the product from the association of an alkali metal amide and the salt from at least one hydroxylated compound with the same alkali metal in an aprotic solvent. The hydroxylated compound is a primary, secondary, or tertiary alcohol. The hydroxylated compound may be a member selected from the group consisting of an alcohol substituted by an heterocyclic group, alcohols containing ethylenic unsaturation, alcohols substituted by an aromatic group, alicyclic alcohols, aromatic alcohols, polyhydroxy compounds, ether-alcohols, polyether-alcohols, and enols from ketones and amino acids.

4 Claims, No Drawings

NOVEL INITIATORS FOR ANIONIC POLYMERIZATION

This invention relates to anionic polymerization and more specifically to novel systems of initiators for anionic polymerization. The invention also relates to a process of anionic polymerization which utilizes the novel initiators of this application and to the polymerizations which are obtained by means of this process.

The first instances of anionic polymerization were carried out by Wurtz with ethylene oxide and they were particularly reported by this author in publications which go back to 1863 (Annales de Chimie et de Physique, volume 69, pages 330–334) and 1878 (Comptes rendus hebdomadaires des Seances de l'Academie de Sciences de Paris, volume 86, pages 1176 etc.). Later Matthews and Strange in British Pat. No. 24,790 which issued in 1910 described the anionic polymerizations of dienes and in 1914 Schlenk and co-workers reported in Chemische Berichte, volume 47, pages 473 et seq. work with the anionic polymerization of styrene.

However, the credit of explaining the mechanism of anionic polymerization is particularly due to Ziegler in Germany with his work which began in 1925. The mechanism of anionic polymerization is the same for vinyl monomers, heterocyclic monomers or dienic monomers.

While a great deal of research work has confirmed the hypotheses formulated at a very early date with respect to the mechanism of the reaction, several groups of workers have concentrated on a search for novel initiators, a fact which demonstrates the importance of finding novel initiators for a successful anionic polymerization on an industrial scale.

In this connection it is proper to differentiate between the simple anionic polymerization which is involved in the present invention and the anionic polymerization through coordination which uses such initiators as the salts of aluminum, antimony and transition metals such as for instance the bi-metallic catalysts of Ziegler and Natta and which is not involved in the present invention.

Within the scope of the simple anionic polymerization sodium historically has been mainly known as initiator and also organo-derivatives of sodium such as sodium-naphthalene and above all organo-lithium compounds such as lithium-alkyl have been known. These substances are known as initiators suitable for industrial applications.

Unfortunately these initiators in general are expensive because the substances themselves are expensive and further they require some precautions which limit their use, due to the fact mainly that they are not stable under the action of heat and humidity, a fact which renders the storage difficult. On the other hand the effectiveness of these initiators is not always sufficient to give a reaction kinetics which is industrially satisfactory with certain monomers.

Several solutions have been proposed particularly with respect to the latter difficulty. For instance it has been possible to modify the activity of the lithium-alkyl by means of tertiary polyamines and polyethers, as described in British Pat. No. 1,066,667, a process which produces copolymers with a random structure. Similarly it has been possible to intensify the action of the lithium-alkyl by means of polyethylene glycols, as described in British patent 1,076,897, aminoalcohols and alkoxyalcohols as described by Maruhashi and Takida, Die Makromolekulare Chemie, volume 124 (1969), pages 172–185); lower alcohols as described by Wiles and Bywater, Journal of Physical Chemistry, volume 68, No. 7 (1964) pages 1983–1987; alkali alkoxides as described by Hsieh and Wofford, Journal of Polymer Science, Part A-1, volume 7 (1969), pages 449–469. An increase in activity in the same order has been noted by association of an alkoxy-alcohol with a magnesium alkyl as described by Narita et al. Polymer Journal, volume 4, no. 4 (1973), pages 421–425 or association of sodium or potassium tertiary butoxide with a sodium alkyl as described by Tai Chun Cheng et al, Journal of Polymer Science, volume 11 (1973), pages 253–259 or with an alkali metal as described by Tai Chun Cheng et al, Ibid, volume 14 (1976), pages 573–581.

In spite of the fact that a great variety of initiators has been proposed, they all have in common the property of comprising at least one constituent which is inherently a very good initiator under the experimental conditions or under similar conditions. Certainly the results would be achieved merely by the association of two constituents which are per se initiators. These facts do not allow to avoid the innumerable limitations mentioned hereinabove which are the results of the chemical reactivity of these initiators.

Applicants have now discovered an initiator for anionic polymerization which permits to alleviate the disadvantages mentioned hereinabove and which results from the association of two types of compounds such that both constituents, if they were used alone, would be either completely inactive as initiators or active as initiators only under extremely favorable conditions, for instance in the polymerization of propylene sulfide or under special conditions totally devoid of any industrial value, for instance with respect to liquid ammonia. The initiators according to the present invention are useful for the polymerization of all monomers which are known to polymerize by a simple anionic mechanism and the polymerization is carried out in a solvent which is either non-polar or mildly polar.

The initiators according to the present invention are characterized by the fact that they result from the association in the presence of a solvent of an alkali amide and the salt of the same alkali metal with at least one hydroxylated compound. According to a preferred embodiment of the invention the initiators are obtained by reaction of the same amide with the hydroxylated compound corresponding to the salt.

These associations have already been noted by Caubère and Loubinoux in Bulletin de la Societe Chimique France (1968), pages 3857–3861 and Ibid (1969), pages 2483–2489 and they have been called "complex bases". Coudert in the thesis submitted in Nancy, France on Oct. 22, 1974 has shown that some of these "complex bases" may be utilized in order to carry out certain reactions and particularly the reactions of alkylation, carbonatation and elimination.

Among the hydroxylated compounds the alkali salts of which in association with the amides of the same metal yield the "complex bases" which are particularly suitable as initiators in the reactions of anionic polymerization, the following substances should be particularly noted:

primary alcohols of formula R—OH in which R is a linear alkyl group, which contains preferably more than two carbon atoms or a branched alkyl group or an alkyl group substituted by a cycloalkyl group or by a cyclic ether or a linear alkyl group substituted by at least one ethylenic double bond and comprising at least two carbon atoms or substituted by at least one aromatic group.

secondary or tertiary alcohols of formula R'—OH in which R' is a linear or branched alkyl, cycloalkyl or polycycloalkyl.

aromatic hydroxy compounds of formula R"—OH in which R" is aryl or polyaryl which may optionally be substituted by alkyl, alkoxy or aminoalkyl groups.

bitertiary glycols containing an alkyl chain in which the hydroxyl groups are in position 1,2,-1,3 or -1,4.

ether alcohols, amino alcohols, polyether alcohols, polyamino alcohols and polyaminoetheralcohols of formula $$R—Y—CHR_1—CHR_2—_n—OH \quad (I)$$

in which R is alkyl, cycloalkyl, arylalkyl, alkylaryl or aryl, and in which Y is an oxygen atom or a nitrogen atom substituted by an alkyl group, the Y's being either all oxygen atoms or all substituted nitrogen atoms, or being both oxygen and substituted nitrogen atoms. Further $R_1$ and $R_2$ may be the same or different and specifically may be a hydrogen atom, methyl or ethyl but Y is necessarily an oxygen atom when $R_1$ and/or $R_2$ are methyl or ethyl and N is an integer number between 1 and 10.

ether alcohols of formula

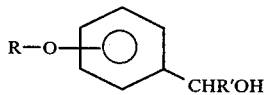

in which R has the meaning indicated hereinabove and R' is a hydrogen atom or a group

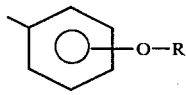

enols of ketones of formula

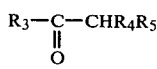

(vinyl alcohols) in which $R_3$ is a hydrocarbon radical and in which $R_4$ and $R_5$ are the same or different and are a hydrogen atom or a hydrocarbon radical.

Other hydroxylated compounds which are suitable within the scope of the invention are diolamines of formula

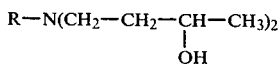

in which R is alkyl and particularly methyl; the aminoalcohol of formula

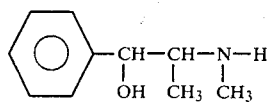

commercial mixtures of mono ethers of polyalkoxy glycols of formula I in which Y is oxygen and N has a value such that the chains contain up to 100 carbon atoms, thiols, thiophenols and trialkylsilanols, other than trimethylsilanols.

It is clear that the preceding list is not exclusive and that other hydroxylated compounds may be used which are also within the scope of the present invention. However these compounds are of more academic interest and/or little economical value.

The common feature which is essential to all the initiators in accordance with the invention is the use of an alkali metal amide. As the amides, only the amide of sodium, lithium and potassium are commercial products. Sodium amide is, however, to a great extent preferable because it gives technically excellent results and it is much less expensive and toxic as compared with lithium amide which is very reactive and irritating to the respitory tract and preferable to potassium amide which is toxic and expensive.

The initiators according to the invention are prepared in the presence of solvents or a mixture of solvents. It should be noted that in the complex bases utilized in the present invention, the alkaline cation participates to the formation of aggregates of which some schematic representations will be given hereinbelow, aggregates which are formed by the amide anions and hydroxylates the latter being formed from the associated hydroxylated compound. The number of molecules of amides which associate with the hydroxy group of the hydroxylated compound is preferably in the order of 3, that is between 2.5 and 3.5. This number may be slightly greater without any interference in the reaction but it should be noted that if it is substantially greater, for instance greater than 10 and particularly if it is substantially lower, for instance less than 2, the initiator may lose its effectiveness either partially or totally. In other words, it is preferable to adjust the amounts of the alkali metal amide and the hydroxylated compound in the solvent in a molar ratio of the amide to the alkali alkoxide in the range of 2 because other ratios generally lead to an initiator which exhibits lower effectiveness and even lack of activity.

The solvents which may be used must be aprotic and may be polar, weakly polar or non-polar. One may utilize polar solvents as long as their chemical structure does not make them reactive under the action of the complex bases utilized in accordance with the invention. For instance hexamethyl-phosphotriamide (HMPT) may be utilized up to a temperature of about 25° C. but for instance dimethylsulfoxide (DMSO), dimethyl formamide (DMF) or N-methylpyrrolidone are decomposed by the complex bases and should preferably be avoided. The polar solvents in any event, within the scope of the present invention, are of little economical and industrial value. Other aprotic solvents of substantially lower polarity may be utilized, for instance pyridine, $\epsilon = 12.3$ at 25° C., although they may undergo some sort of degradation at the end of a certain period of time particularly if the temperature is somewhat elevated.

The aprotic, mildly polar solvents, of dielectric constant less than 10 at 25° C. are particularly suitable for the preparation of initiators in accordance with the invention. Therefore, ethers and polyethers, both linear are cyclic such as tetrahydrofuran (THF), dimethoxyethane (DME), dimethyl glycol ethers, diglycol dimethyl ethers and triglycol dimethyl ethers (glymes, diglymes and triglymes) give good results generally in a very short period of time.

However, and this feature is a very substantial advantage of the initiators according to this invention, one may prepare the initiators as easily in a non-polar solvent which is the same as the solvent in which one carries out advantageously the subsequent step of polymerization. Therefore, one may utilize alkanes or cycloalkanes such as for instance hexane, heptane or cyclohexane or aromatic hydrocarbons such as benzene or toluene.

When one utilizes solvents which contain an ether linkage, it is important to carefully eliminate oxygen and peroxides which may be present in the solvent and this may be achieved by known methods.

The preparation of the initiators according to the invention may be carried out by means of several methods which are about equivalent, because what is involved is to place in the presence of a solvent an alkali amide and the hydroxylated compound. However these variations are not equivalent from from an economical point of view. In this regard the most interesting method of preparation and which is preferable consists of introducing in a reactor first the solvent, then the alkali amide and finally the hydroxylated compound, advantageously under stirring.

According to the embodiments which are not recommended one may add a suspension of the alkali amide to a solution of the hydroxylated compound in the same solvent or one may place the hydroxylated compound and the amide into a reactor and finally add the solvent alone over the mixture.

It is usually possible, but this embodiment is of no interest, to prepare the initiator in accordance with the invention by placing in a reactor a suspension of the alkali amide in a solvent and a solution of the salt of the hydroxylated compound with the same alkali metal. The latter solution, however, always contains some of the free hydroxylated compound at least in traces. Of course, this method requires that the solution of the salt of the hydroxylated compound be prepared separately and ahead of time. In this case the the preparation of the solution of the salt of the hydroxylated compound is accompanied by the usual well-known disadvantages.

The reaction of formation of the complex base gives rise at the same time to the formation of the initiator according to the invention and to the evolution, which is usually perceptible, of ammonia derived from the action of the amide anion with the proton of the hydroxylated compound. When the complex base is formed, in general one obtains a mixture which forms ordinarily several layers. The lower layer consists of the solid alkali amide which is not in the form of a complex or which is incompletely complexed; the upper layer contains the complex base in a clear solution. With certain solvents one obtains an intermediate layer which is in the form of a milky suspension and which may have the consistency of a gel.

The alkali amide is preferably used crushed in a granular state, the average size of which is a function of the size of the reactor in which the polymerization is carried out. It is important to note that the particle size may be the greater, the greater is the size of the reactor. The crushing step may be carried out in the presence of a small quantity of a solvent which is aprotic and mildly polar.

The alkali amide may be utilized with a degree of purity which may vary from commercial grade up to analytical grade. It may contain a certain amount of soda to the extent that the latter is known to be present in the sodamide and to the extent that it does not interfere with the preparation of the complex base with the proportions of the reagents recommended hereinabove.

With respect to the moisture, it is preferable to remove the moisture from the reagents, the solvent and the reactor and all pieces of equipment being used. However, it should be noted that the cost of sodium amide permits a degree of dryness which is less drastic than in the case of the preparation of known initiators. Actually the utilization of a slight excess of alkali amide permits the elimination of traces of moisture in a very satisfactory manner because the same alkali amide reacts with the traces of moisture present, in order to form products which do not interfere with the reaction of formation of the complex base or the subsequent reaction of polymerization. The reaction of formation of the complex base is advantageously carried out in certain cases in the reactor which subsequently serves for the polymerization and this constitutes an advantage because it permits to cut down the introduction of moisture into the apparatus. This reaction of complex base formation is preferably carried out at a temperature between 20° and 60° C. One may operate at a lower temperature but the reaction of formation of the complex base becomes much longer up to a temperature, in general, below about 0° C., at which the rate of reaction is essentially zero. One may operate also at higher temperature but then the possibility of degradation of the alkali amide or degradation of the solvent increases. It is recommended to keep the reaction medium under agitation.

In the majority of cases, the duration of the reaction of initiator formation is at least one hour but does not exceed four hours. In any event a much more prolonged heating may turn out to be necessary in some cases in which the materials are less reactive.

Finally it should be noted that the initiators in accordance with the present invention offer a versatility of use which rarely has been encountered with the initiators known in the art. In fact if one must prepare the initiators for reasons of convenience or necessity in a solvent which is not the same as the solvent in which the polymerization later is carried out, one usually encounters difficulties; in fact the polarity of the medium is modified and for instance the structure of the polymer which is obtained is not in accordance with expectations. On the other hand the initiators according to this invention may be prepared in a first solvent, for instance a mildly polar solvent and then this solvent is evaporated under vacuo practically to completeness and finally a second solvent, for instance a non-polar solvent in which it is desired to carry out the subsequent polymerization is added above the complex base so that the properties of the complex base remain unaffected. The invention, therefore, permits to achieve the synthesis of the initiator under predetermined conditions without reducing in any way the possibility to carry out the polymerization under the ideal conditions predetermined ahead of time.

The invention also relates to a process of polymerization in which an initiator as described hereinabove is utilized.

It should be noted in this connection that it is possible to associate to the amide several hydroxylated compounds at the same time but it does not appear that this modification gives any particular advantage.

The fact that the initiators according to the invention are being used does not introduce any unusual limitations in the subsequent polymerization reaction.

The temperature at which the polymerization is carried out is not necessarily the same as the temperature at which one prepares the initiator and may be between −80° C. and +70° C. On the other hand one may vary the temperature during the polymerization, a fact which is particularly advantageous when copolymerizations are carried out and a specific distribution of the copolymerized species is desired or when a particular microstructure or a more rapid reaction kinetics are desirable.

The quantity of the initiator required for the process clearly depends in general on the average molecular weight which one desires to achieve, for instance a molar ratio of amide to monomer in the order of 1% may be used but it is proper to stress the fact that it is possible to utilize a higher ratio and this is even more so since the amide is a substance of relatively low cost.

The duration of the polymerization reaction depends on several factors. It varies from a period of a few seconds up to 24 and even 48 hours.

It should be noted that one of the most significant features of this invention is that the polymerization may be carried out by means of either a heterogeneous or a homogeneous initiator. In fact it is possible to utilize only the upper clear supernatant of the complex base and carry out the reaction in a homogeneous medium, a fact which gives rise to rapid reactions and molecular weights over a narrow range. However, it is also possible to utilize the entire system of the complex base or only the lower pasty layer and in the latter case the polymerization is initiated at a rate which is more or less substantial by means of an initiator in a heterogenous phase, a fact which results in particular properties of the resulting polymers, for instance the molecular weight distribution of the polymer is in general more scattered.

As in the case of all anionic polymerizations it is advantageous to utilize only reagents, solvents and all pieces of equipment which are dry. However, this limitation which affects the success of the polymerization is less strongly noted when one utilizes the process according to the present invention, because the alkali amide, which is a substance of low cost, has the property of reacting with traces of moisture and giving products which do not interfere either with the initiation nor the propagation of the reaction and which do not cause an undesirable premature termination.

The termination of the reaction may be achieved in a known manner for instance by introduction of a proton-containing agent such as an alcohol, for instance methanol or hexanol and/or by precipitation of the reactive reaction system in methanol.

It is very desirable to purify the solvents as well as the reagents. The solvents, which are the same as the solvents in which the complex base may be formed, a fact which particularly groups together all the solvents of dielectric constant less than 10 at 25° C., are purified in a manner well-known to chemists familiar with anionic polymerization. It is, therefore, possible to proceed for example by distillation over soda or potassium hydroxide and afterwards optionally by distillation over sodium and finally drying over sodium wire. As far as the monomers are concerned, they are purified in known and conventional manner according to their chemical structure and this varies from a single distillation to a double distillation over molecular sieves, calcium hydroxide, alkali metal or even a living polymer such as isoprenyl-lithium.

The monomers which are interesting within the scope of this invention are, as it has already been discussed hereinabove, those substances which are known to polymerize by a purely anionic mechanism or in other words, monomers which are susceptible to anionic polymerization by opening of either an ethylenic double bond or an heterocyclic ring. Keeping in mind that anionic polymerizations have been investigated for more than a century, it is clear that the number of monomers which are capable of anionic polymerization is very long and the mechanism of the reaction is well known. In any event it is advantageous to point out that this mechanism is the same no matter whether the monomer is an heterocyclic compound or whether it contains an ethylenic double bond or an aldehydic group, the latter being essentially considered as an heterocyclic compound containing two atoms, because the initiation occurs by cleavage of a bond with resulting formation of an anionic monomer, independently from the nature of the atom which carries the negative charge. The negative anionic monomer attacks a new monomer molecule which carries in turn the negative charge and so on until all the monomer has reacted or until the reaction ends. In this connection reference is made for instance to the work of Professor Georges Champetier, "Chimie Macromoleculaire", Volume I, Hermann Edition, Paris (1969).

Among the monomers it is in any event possible to list the following substances although this list is not exclusive. Among the vinylic monomers, those of general formula

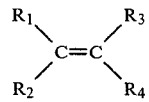

may be considered in which $R_1 = R_2 = R_3 = R_4 = H$ (when all the substituents are equal to hydrogen obviously the monomer is ethylene itself)

$R_1 = R_2 = R_3 = H$ and $R_4 =$ alkyl

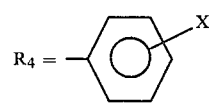

in which X=H, Cl, —OCH$_3$ or —C(CH$_3$)$_3$

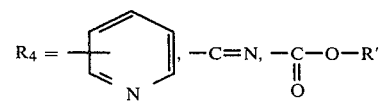

in which R': alkyl or cycloalkyl,

(in which R″=alkyl)

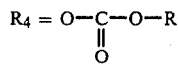

(in which R=alkyl, particularly methyl, or aryl, particularly phenyl)

R$_1$=R$_2$=H, R$_3$=—CH$_3$, R$_4$=phenyl, cyano or

(R′=alkyl or cycloalkyl).

Among the heterocyclic monomers, there may be mentioned alkylene oxides, alkylene sulfides, lactones, lactams, thietanes, siloxanes, cyclic carbonates and also ethylene oxide, propylene oxide, propylene sulfide, β-propiolactone, ε-caprolactone, pivalolactone, ε-caprolactam, hexamethyl cyclotrisiloxane, octamethyl-cyclo-tetrasiloxane, propylene glycol carbonate, neopentyl glycol carbonate and others.

Among the conjugated dienes the substances of general formula

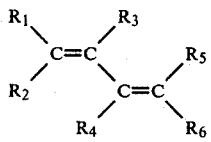

R$_1$=R$_2$=R$_3$=R$_4$=R$_5$=R$_6$=H (in this case the substance is 1,3-butadiene)

R$_1$=R$_2$=R$_4$=R$_5$=R$_6$=H and R$_3$=alkyl or aryl

R$_1$=R$_2$=R$_3$=R$_4$=R$_5$=H and R$_6$=alkyl, aryl, nitrile or nitro

R$_1$=R$_2$=R$_5$=R$_6$=H and R$_3$=R$_4$=—CH$_3$

R$_1$=CH$_3$ and R$_2$=R$_3$=R$_4$=R$_5$=R$_6$=H or alkyl

R$_1$=R$_3$=R$_4$=R$_5$=H and R$_1$=R$_6$=phenyl

Among dienes containing two ethylenic double bonds which, however, are not directly conjugated, one can mention divinylbenzene, cyclohexadienes substituted such as for instance 3, 3,6,6-tetramethyl, 1,2,-4,5-hexadiene, vinyl carbonates or allyl carbonates, carbonates of polyhydroxy compounds or polyether polyhydroxy compounds such as allyl diglycol carbonate.

The process according to the present invention is applicable to reactions of homopolymerization and reactions of copolymerization with monomers which may be of the same general type as well as monomers which may be of a totally different type.

The process of polymerization according to the invention is preferably carried out in an inert atmosphere, for instance nitrogen or argon or under vacuo. The process is particularly but not exclusively interesting when it is utilized with the following initiators which are designated hereinbelow for the sake of simplicity by the amide and the hydroxylated compound which is associated with the amide to form the complex base.

Na NH$_2$, a linear or branched primary alcohol such as:
  NaNH$_2$, 2-methyl propanol
  NaNH$_2$, 2,2-dimethyl propanol
Na NH$_2$, an alcohol which has attached to it an heterocyclic group such as:
  NaNH$_2$, tetrahydrofurfuryl alcohol
  LiNH$_2$, tetrahydrofurfuryl alcohol
Na NH$_2$, an alcohol which carries an ethylenic double bond or an aromatic group such as:
  NaNH$_2$ allyl alcohol
Na NH$_2$, secondary or tertiary alcohol such as:
  NaNH$_2$, 2,6-dimethyl 3-heptanol
  NaNH$_2$, isopropanol
  NaNH$_2$, neopentyl alcohol
  NaNH$_2$, t-butanol; also KNH$_2$, t-butanol
  NaNH$_2$, 2-methyl 2-hexanol
  NaNH$_2$, 2-methyl 2-butanol
  NaNH$_2$, 5-n-butyl 5-nonyl alcohol
Na NH$_2$, alicyclic alcohol such as:
  NaNH$_2$, 2-methyl cyclohexanol
  NaNH$_2$, adamantanol
Na NH$_2$, aromatic hydroxy compound such as:
  NaNH$_2$ phenol
  NaNH$_2$ diethylaminophenol
Na NH$_2$, polyol, particularly a glycol such as:
  NaNH$_2$, 2,5-dimethyl 2,5-hexanediol
Na NH$_2$, ether alcohol such as:
  NaNH$_2$, methyl ether of ethylene glycol
  NaNH$_2$, butyl ether of ethylene glycol
  NaNH$_2$, phenyl ether of ethylene glycol
  NaNH$_2$, methoxyphenylmethanol
  NaNH$_2$, di(methoxyphenyl) methanol
Na NH$_2$, polyether alcohol such as:
  NaNH$_2$, methyl ether of diethylene glycol
  NaNH$_2$, ethyl ether of diethylene glycol
  LiNH$_2$, or KNH$_2$, ethyl ether of diethylene glycol
  NaNH$_2$, butyl ether of diethylene glycol
  NaNH$_2$, phenyl ether of diethylene glycol
  NaNH$_2$, decyl ether of diethylene glycol
  NaNH$_2$, ethyl ether of triethylene glycol
  NaNH$_2$, butyl ether of triethylene glycol
  NaNH$_2$, ethyl ether of pentaethylene glycol
  NaNH$_2$, ethyl ether of hexaethylene glycol
Na NH$_2$, enol from a ketone such as:
  NaNH$_2$, diethyl ketone (in the enolic form)
  NaNH$_2$, methylphenyl ketone (in the enolic form).

It is clear from the foregoing that the alkali amides and particularly sodium amide may be associated with a great number of hydroxylated compounds to give an effective initiator. This effectiveness is clearly a function of the monomer being reacted because certain monomers polymerize almost spontaneously and others very slowly under certain experimental conditions. It should be noted that the preceding list is not exclusive and that many other complex bases may be formed from the association of many other amides and hydroxylated compounds which are still useful within the scope of the invention.

It should be noted that the alkali amides which have been considered hereinabove as far as it is known at present, are incapable of giving rise to any significant extent to an initiation of the anionic polymerization from the monomers which are capable of undergoing this reaction. This invention is, therefore, very surprising to one skilled in the art who did not know of the very specific and very special cases of initiation under the action of alkali amides. Moreover one skilled in the art would have been convinced not to carry out research along these lines the more so because the substituted amides are much more reactive and more expensive than the alkali amides and further the substituted amides which are known to initiate certain polymerizations have limitations. In this connection ANGOOD et al in Journal of Polymer Science, Vol. 11, 2777-2791 (1973) have shown that styrene may be initiated by means of the diethyl amide of lithium only in the presence of solvents which have a little polarity, while this monomer which in general polymerizes quite easily, does not undergoe polymerization in hydrocarbon solvents.

It is, therefore, appropriate to note that the initiators according to the invention must be distinguished from the products resulting from the association of butyl lithium, for instance with ethers by a mechanism of complex formation which is different from the mechanism of complex formation between the amide and the substance to which the amides becomes associated. In fact this complex formation in accordance with the invention is not limited to a simple solvation but results equally from a bond of the electrostatic type which may be illustrated in schemes A and B hereinbelow and which very likely gives rise to aggregates

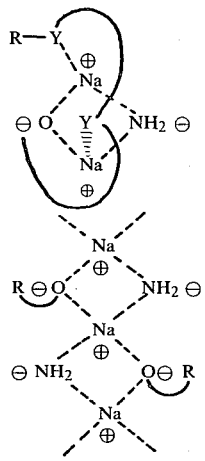

In scheme A, for instance in which a polyether alcohol is used it is likely that at the same time both solvation and electrostatic bonds are present; in scheme B in which R is alkyl for instance it is likely that only electrostatis bonds are present.

The present invention should be also distinguished from the processes in which the activity of the anion starting material is intensified by means of cryptates which literally enclose the associated ketone in a cage. This process is described in British Pat. No. 1,426,547. In the latter case the ketone is only sequestered because of the existence of coordination bonds with the hetero atoms of the cryptate. The advantages of the process according to the present invention have already been described to a great extent hereinabove. It is, however, appropriate to note that sodium amide offers the advantage with respect to the organo lithium compounds ordinarily used because of the ease of storage and indeed one can only use solutions of organo lithium compounds of relatively low concentration while sodium amide is a solid. Further, sodium amide may be used with ease since traces of moisture interfere less with the process according to the present inventions as compared with processes in which lithium alkyls are used. Finally the initiators of the present invention are advantageous because of the high ratio of effectiveness/cost particularly if one considers that the initiators according to the invention have general application and may be used in inexpensive hydrocarbon solvents. Still another advantage is that the cost of sodium amide which is a commercial product, is relatively low. On the other hand it is possible to observe that for the purpose of comparing sodium amide to organo lithium compounds, both sodium and liquid ammonia which are the starting materials cost much less than lithium and alkyl halides and finally that in the case of organo lithium compounds one half of the lithium is not used because of the reaction RX=2 Li→R—Li+LiX.

Another substantial advantage of the initiators according to the present invention is that they provide a great deal of possibilities. For instance it is possible to modify the average molecular weight within a great range and also to modify the molecular weight distribution and/or the microstructure of the polymer from a given monomer, simply by modifying for instance one of the experimental conditions such as the temperature, the reaction time, the nature of the solvent or the nature of the hydroxylated compound, the other conditions remaining the same. Finally one of the characteristic features of the process is that it permits, if desired, to obtain polymers in which one of the terminal groups is an amino group which may be caused to react further. This property is particularly interesting in the case of oligomeric prepolymers which can be prepared very easily according to the present invention as already discussed hereinabove.

The invention, therefore, finds application in the synthesis of polymers with a great range of possibilities as well as special polymers.

In the examples which follow, which are given hereinbelow for the purpose of illustrating the invention and which should not be considered as limiting the present invention, emphasis has been given to showing the variety of possibilities offered by the initiators according to this invention as well as the innumerable modifications of the process as described hereinabove. The following are examples according to this invention.

EXAMPLE 1

Polymerization of styrene by NaNH$_2$, diethylene glycol monoethyl ether. A reaction flask of 250 cc capacity, previously dried, is swept with argon and then there is introduced 0.98 g (25.10$^{-3}$ mole) of sodium amide suspended in tetrahydrofuran, 1.11 g (8.3.10$^{-3}$ mole) of diethylene glycol monoethyl ether and 300 cc of tetrahydrofuran.

The mixture is vigorously stirred for two hours at 45° C. To the resulting yellow solution there is added 8.32 g of purified styrene (8.10$^{-2}$ mole). The solution acquires very rapidly a red color which is characteristic of the sodium-polystyrene anion, the viscosity increases and the temperature rises to 70° C. The reaction is stopped by addition of methanol and the solution is discolored. The polymer which precipitates in the methanol, is filtered and then dried under vacuo. The yield of the reaction is 100% and one obtains the following values of molecular masses:

Number average molecular weight Mn=81,000
Weight average molecular weight Mp=187,000
Polymerization index Mp/Mn=2.31
Average molecular weight determined by ultracentrifugation Mz=333,000.
Molecular weight determined by the viscosimetric method: Mv=171,000 Mn/Mv=1.95.

EXAMPLE 2

Polymerization of styrene by the system NaNH$_2$-tertiary butyl alcohol. The manner of operation is the same as in Example 1. The quantities of material being used are as follows: 0.98 g (25·10$^{-3}$ mole) of sodium amide, 0.61 g (8.3·10$^{-3}$ mole) of tertiary butyl alcohol, 10.4 g (10$^{-1}$ mole) of styrene and 30 cc of tetrahydrofuran.

The temperature rise is not immediate and the orange color appears only slowly. The reaction is stopped at the end of 18 hours.

One obtains a 100% yield and the following values are obtained:
Mn=20,000
Mp=55,000
Mz=100,000
Mv=50,000
I=Mp/Mn=2.73
Mz/Mv=2

EXAMPLE 3

Polymerization of styrene by the system sodium amide, diethylene glycol monoethyl ether. The manner of operation is the same as in Example 1 but one carries out the polymerization and the preparation of the complex base in benzene. The amounts of the materials are 0.98 g (25·10$^{-3}$ mole) of sodium amide, 1.11 g (8.3·10$^{-3}$ mole) of diethylene glycol monoethyl ether and 8.32 g (8·10$^{-2}$ mole) of styrene and 30 cc of benzene.

The same observations are made here as in the preceding example and one obtains a yield of 30% after the reaction has proceeded for 18 hours. The measured values of molecular masses are the following:
Mn=72,000
Mp=185,000
Mz=340,000
Mv=168,000
I=Mp/Mn=2.57
Mz/Mv=2.02

EXAMPLE 4

Polymerization of styrene by means of only sodium amide. An attempt has been made to polymerize purified styrene, 10.4 g (10$^{-1}$ mole) in 50 cc of THF in the presence of 0.98 g (15·10$^{-3}$ mole) of sodium amide at 40° C. in the absence of the activator according to the invention. The reaction was stopped at the end of 72 hours but no polymerization has been noted.

EXAMPLE 5

Polymerization of styrene by the system of NaNH$_2$-diethylene glycol monoethyl ether. The experiment described in Example 1 has been carried out by increasing the amount of styrene being reacted. 84 g of styrene (0.8 mole) are polymerized in 100 cc of THF in the presence of the same quantity of activator as in Example 1. The reaction occurs instantaneously and the yield is 100%. The molecular mass of the polymer obtained is:
Mn=750,000
Mp=2,000,000.

EXAMPLE 6

Polymerization of methyl methacrylate by the system NaNH$_2$, diethylene glycol monoethyl ether. There is introduced into a reaction flask at first 0.98 g (25·10$^{-3}$ mole) of sodium amide, followed by 1.07 g (8·10$^{-3}$ mole) of diethylene glycol monoethyl ether in 50 cc of THF in a nitrogen atmosphere. To the complex base which is formed during the period of two hours at 45° C., there is added under vigorous stirring 8 g (8·10$^{-2}$ mole) of methyl methacrylate. The yellow color of the solution become slightly deeper and the reaction mixture which is only maintained under a slight nitrogen pressure, is let stand during a period of three hours.

The polymer is precipitated in methanol and is then filtered and dried under vacuo. There is obtained a yield of 100% and a number molecular weight of 13,000.

EXAMPLE 7

Polymerization of methyl methyacrylate by the system NaNH$_2$, diethylene glycol monoethyl ether. The manner of operation of the preceding example is repeated but 50 cc of THF are replaced by 100 cc of benzene. At the end of three hours there is obtained a polymer of number molecular weight 17500. Yield: 90%.

EXAMPLE 8

Polymerization of methyl methacrylate by the system NaNH$_2$ tertiary butyl alcohol. The same manner of operation described in example 6 is used in the presence of 0.61 g (8.3·10$^{-3}$ mole) of tertiary butyl alcohol and 0.98 g (25·10$^{-3}$ mole) of sodium amide in 100 cc of THF. There is then added 6 g (6·10$^{-3}$ mole) of methyl methacrylate and polymerization is allowed to proceed for a period of 18 hours.

There is obtained a polymer with Mn=12,500. Yield: 45%.

EXAMPLE 9

Polymerization of methyl methacrylate by means of only NaNH$_2$. An attempt has been made to polymerize 10 g (10$^{-1}$ mole) of methyl methacrylate in 60 cc of THF in the presence of 0.98 g (25·10$^{-3}$ mole) of sodium amide but in the absence of the activator according to the invention. At the end of 48 hours only very faint polymer formation is noted corresponding to a yield less than 5%.

EXAMPLE 10

Polymerization of styrene by the system NaNH$_2$ and glycol monomethyl ether. The experiment is carried out in the same manner as in Example 6 with a mild overpressure of argon in the reactor. The complex base consists of a mixture of 0.98 g (25·10$^{-3}$ mole) of sodium amide and 0.63 g (8.3·10$^{-3}$ mole) of glycol monomethyl ether in 40 cc of tetrahydrofuran. There is obtained a reaction mixture the color of which is yellow but less strong as compared with the yellow color of the complex bases described in the previous examples.

After the addition of the monomer, 8.32 g which corresponds to 8·10$^{-3}$ mole of purified styrene, one notes that the solution acquires a deep yellow color. At the end of four hours, there is obtained a polymer of number average molecular weight 10,000. Yield: 30%.

EXAMPLE 11

Polymerization of styrene with the system NaNH$_2$ and triethylene glycol monobutyl ether. Polymerization is allowed to proceed from 8.32 g (8·10$^{-22}$ mole) of styrene in in 30 cc THF in the presence of 0.98 g (25·10$^{-3}$ mole) of sodium amide and 1.71 g (8.3·10$^{-3}$ mole) of triethylene glycol monobutyl ether. The reaction mixture which is obtained prior to the addition of the monomer has a yellow color which is more pronounced than that obtained with diethylene glycol monoethyl ether, contrary to the results which have been obtained with glycol monomethyl ether. At the end of four hours, a polymer is obtained in 50% yield, with Mn=8500.

EXAMPLE 12

Copolymerization of styrene and methyl methacrylate with the system $NaNH_2$ and diethylene glycol monoethyl ether. As discussed in the previous example, one prepares a mixture of the complex base by stirring over a period of two hours, at 45° 0.98 g of sodium amide and 1.11 g of diethylene glycol monoethyl ether in 100 cc of THF. Styrene, in the amount of 4.16 g ($4 \cdot 10^{-2}$ mole) is then added at a temperature of 45° to the initiator mixture. The solution becomes red.

After stirring for 15 minutes, the temperature of the reaction mixture is lowered to −20° C. There is then added 5 g ($5 \cdot 10^{-2}$ mole) of methyl methacrylate and stirring of the solution which has become yellow is continued at −20° C. for a period of 1½ hours. The polymer is then precipitated in methanol, filtered and dried under vacuo. The yield of the reaction is 50%. The product on the basis of chromatography data, gel permeation is established to be a copolymer of 70% styrene and 30% methyl methacrylate.

EXAMPLE 13

The same procedure described in the preceding example is followed but the addition of methyl methacrylate is carried out at +30° C. There is obtained a copolymer with a yield of 35% which on the basis of chromatography gel permeation contains 50% of styrene and 50% methyl methacrylate.

EXAMPLES 14-44

Several initiators according to the present invention are prepared according to the identical process and the polymerization of styrene is carried out with these initiators under identical conditions. The initiator is obtained by adding $8 \cdot 10^{-3}$ mole of the hydroxylated component in solution in 20 cc of toluene to $25 \cdot 10^{-3}$ mole of sodium amide previously ground in a mortar after which the suspension is heated under stirring for a period of two hours at 40° C. The polymerization is always carried out under nitrogen by the introduction of 10 cc styrene into the initiator. The reaction mixture is maintained at 60° C. for a period of 24 hours. The following table summarizes the results, including the yield of the reaction, the number average molecular weight, the weight average molecular weight and the ratio Mp/Mn, the polymerization index.

| Ex. | Hydroxylated Compound | Yield % | Mp | Mn | Mp/Mn |
|---|---|---|---|---|---|
| 14 | (furfuryl)—$CH_2OH$ | 28 | 434700 | 43660 | 9.96 |
| 15 | (phenyl with $CH_2OH$ and $OCH_3$) | 87 | 341680 | 34770 | 9.83 |
| 16 | $C_2H_5(OCH_2CH_2)_2OH$ | 38 | 53150 | 4625 | 11.56 |
| 17 | $C_{10}H_{21}(OCH_2CH_2)_2OH$ | 16 | 152250 | 33200 | 4.60 |
| 18 | $(CH_3)_2CHOH$ | 22 | 84020 | 22375 | 3.75 |
| 19 | $C_4H_9(OCH_2CH_2)_2OH$ | 10 | 46725 | 10250 | 4.56 |
| 20 | $[CH_3(CH_2)_3]_3COH$ | 67 | 71500 | 30650 | 2.35 |
| 21 | $(CH_3)_3CCH_2OH$ | 35 | 172800 | 24300 | 7.10 |
| 22 | $C_4H_9OCH_2CH_2OH$ | 16 | 115900 | 35140 | 3.30 |
| 23 | (phenyl)—$OCH_2CH_2OH$ | 47 | 87700 | 27920 | 3.14 |
| 24 | $CH_3(CH_2)_{11}OH$ | 22 | 195200 | 46700 | 4.18 |
| 25 | $CH_3(OCH_2CH_2)_2OH$ | 55 | 69900 | 4740 | 14.75 |
| 26 | $CH_3(CH_2)_3-C(CH_3)(OH)(CH_3)$ | 58 | 113800 | 41020 | 2.77 |
| 27 | (cyclohexyl with OH and $CH_3$) | 29 | 65800 | 26020 | 2.53 |
| 28 | $CH_3O$—(phenyl)—$CH_2OH$ | <10 | 174060 | 58400 | 2.98 |
| 29 | $[(CH_3)_2CH]_2CHOH$ | 23 | 180540 | 34375 | 5.25 |
| 30 | $(CH_3)_3COH$ | 36 | 172850 | 45450 | 3.80 |
| 31 | $(CH_3O$—(phenyl)—$)_2$—CHOH | <10 | 136670 | 20605 | 6.63 |
| 32 | $C_2H_5(OCH_2CH_2)_3OH$ | 11 | 214530 | 16725 | 12.83 |
| 33 | $CH_3CH_2-C(CH_3)(OH)(CH_3)$ | 91 | 142950 | 31900 | 4.50 |

-continued

| Ex. | Hydroxylated Compound | Yield % | Mp | Mn | Mp/Mn |
|---|---|---|---|---|---|
| 34 | C₆H₅—(OCH₂CH₂)₂OH | 22 | 129700 | 43395 | 2.99 |
| 35 | $C_4H_9(OCH_2CH_2)_3OH$ | <10 | 99000 | 19990 | 4.95 |
| 36 | $C_2H_5(OCH_2CH_2)_4OH$ | 20 | 206,300 | 11930 | 17.30 |
| 37 | $C_2H_5(OCH_2CH_2)_5OH$ | 12 | 49,950 | 7240 | 6.9 |
| 38 | $C_2H_5(OCH_2CH_2)_6OH$ | 77 | 28,900 | 6900 | 4.18 |
| 39 | $(CH_3)_2CHCH_2OH$ | 19 | 136,800 | 2900 | 4.71 |
| 40 | $(C_2H_5)_2CO$ | 37 | 480000 | 110000 | 4.4 |
| 41 | C₆H₅—CO—CH₃ | 13 | 120000 | 26000 | 4.6 |
| 42 | C₆H₅—OH | 16 | 70000 | 26000 | 2.7 |
| 43 | CH₂=CH—CH₂OH (allyl alcohol) | 11 | 300000 | 31000 | 9.7 |
| 44 | 2-OH, 4-NEt₂-C₆H₃ | <5 | 40,000 | 3000 | 13.3 |

It is clear on the basis of the results obtained hereinabove that the process according to the present invention permits to achieve a very large range of molecular weights simply by modifying the hydroxylated compound which is associated with the sodium amide.

However, it should be noted that the conditions for the formation of the initiator and for the polymerization have been strictly followed in the preceding examples and that they are not necessarily favorable for every one of the initiators and that they are particularly considered drastic in the case of those initiators which have given rise to the lowest yields.

EXAMPLES 45–62

For the purpose of illustrating what has just been said hereinabove, initiators are prepared according to the invention and styrene is polymerized under conditions similar to the conditions used in the preceding examples but tetrahydrofuran (THF) is used in place of toluene. The initiator is prepared in each instance in the same manner as specified for Examples 14 through 45, that is with $25 \cdot 10^{-3}$ mole of sodium amide and $8 \cdot 10^{-3}$ mole of the hydroxylated compound kept at 40° C. for two hours in the presence of THF.

The polymerization of styrene in the amount of 10 cc is carried out in a nitrogen atmosphere at 50° C. unless it is differently stated for the period of time indicated in the table which may vary from a few seconds to 24 hours in a reaction medium which contains a total of 20–40 cc of THF. Example 62 is carried out in the same manner but lithium amide is used.

| Ex | Hydroxylated Compound | THF cc | Duration of reaction in hours | Yield % | Mp | Mn | Mp/Mn |
|---|---|---|---|---|---|---|---|
| 45 | $C_2H_5(OCH_2CH_2)_2OH$ | 30 | instantaneous at 45° C. | 100 | 187 000 | 81 000 | 2.31 |
| 46 | $(CH_3)_3COH$ | 30 | 18 at 45° C. | 100 | 55 000 | 20 000 | 2.73 |
| 47 | $CH_3 OCH_2CH_2 OH$ | 40 | 4 at 45° C. | 30 | 25 000 | 10 000 | 2.5 |
| 48 | $C_4H_9(OCH_2CH_2)_3 OH$ | 40 | 4 at 45° C. | 50 | 23 000 | 8 005 | 2.7 |
| 49 | $C_4H_9 OCH_2CH_2 OH$ | 40 | 7 | 87 | 28 100 | 13 900 | 2.03 |
| 50 | $C_4H_9 (OCH_2CH_2)_2OH$ | 40 | 7 | 95 | 5 800 | 4 200 | 1.38 |
| 51 | $C_{10}H_{21}(OCH_2CH_2)_2OH$ | 40 | 6.5 | 5 | 85 700 | 37 800 | 2.27 |
| 52 | tetrahydrofurfuryl alcohol (furan-CH₂OH) | 40 | 1.5 | 100 | 216 000 | 94 000 | 2.30 |
| 53 | 2-OCH₃-C₆H₄-CH₂OH | 40 | 6.5 | 80 | 12 200 | 7 000 | 1.74 |
| 54 | $(CH_3)_2CHOH$ | 40 | 7 | 88 | | 19 400 | 2.07 |
| 55 | $[CH_3(CH_2)_3]_3 OH$ | 40 | 7 | 12 | 11 800 | 5 000 | 2.37 |
| 56 | C₆H₅—OH | 20 | 24 | 67 | 11 000 | 2 008 | 3.9 |
| 57 | C₆H₅—CO—CH₃ | 20 | 24 | 91 | 12 500 | 4 005 | 2.8 |

-continued

| Ex | Hydroxylated Compound | THF cc | Duration of reaction in hours | Yield % | Mp | Mn | Mp/Mn |
|---|---|---|---|---|---|---|---|
| 58 | $(CH_3CH_2)_2 CO$ | 20 | 24 | 33 | 47 000 | 5 100 | 9.2 |
| 59 | ⌇⌇OH (allyl alcohol) | 20 | 24 | 100 | 25 000 | 8 900 | 2.8 |
| 60 | (phenol with CH₂ ortho, with N(Et)₂ para-ish) OH / Et-N-Et | 20 | 24 | 33 | 73000 | 7900 | 9.2 |
| 61 | $CH_3-\underset{\underset{OH}{\vert}}{\overset{\overset{CH_3}{\vert}}{C}}-CH_2CH_2-\underset{\underset{OH}{\vert}}{\overset{\overset{CH_3}{\vert}}{C}}-CH_3$ | 40 | 22 | 78 | 24000 | 7700 | 3.1 |
| 62 | $C_2H_5(OCH_2CH_2)_2 OH$ | 20 | 24 at 60° C. | 16 | 232740 | 31050 | 7.5 |

EXAMPLES 63–69

The polymerization of styrene is carried out in a variety of solvents with a variety of amides and a variety of hydroxylated compounds. An initiator is prepared as described hereinabove and the polymerization is carried out from 10 cc of styrene in each instance in a nitrogen atmosphere and the reaction is stopped at the end of three hours.

| Ex. No. | Amide | Hydroxylated Compd. | Solvent cc | 0° C. | Yield % | Mn | Mp | MP/Mn | Observations |
|---|---|---|---|---|---|---|---|---|---|
| 63 | $NaNH_2$ | $C_4H_9(O-CH_2-CH_2)_2OH$ | THF 38 | 40 | 100 | 35 000 | 93 500 | 2.7 | The solution of the initiator is milky white; then the color turns to brown after introduction of monomer. |
| 64 | $NaNH_2$ | $C_4H_9(O-CH_2-CH_2)_2OH$ | THF 42 | 0 | 20 | 9 000 | 18 000 | 2 | The solution of the initiator is milky white; then the color turns to pale pink after introduction of monomer. |
| 65 | $NaNH_2$ | $C_4H_9(O-CH_2-CH_2)_2OH$ | THF 40 | −20 | 10 | 13 000 | 22 000 | 1.7 | The solution of the initiator is milky white; then the color turns to orange after introduction of monomer. |
| 66 | $NaNH_2$ | $C_4H_9(O-CH_2-CH_2)_2OH$ | THF 37 | −80 | 1 | 5 000 | 7 500 | 1.5 | Same. |
| 67 | $NaNH_2$ | tetrahydrofurfuryl-CH₂OH | pyridine 38 | 40 | 11 | 3 000 | 18 000 | 6 | The solution of the initiator is brown; the color turns reddish brown after introduction of monomer. |
| 68 | $LiNH_2$ | tetrahydrofurfuryl-CH₂OH | THF 42 | 40 | 22 | 1 850 | | | The solution of the initiator is white but the color then turns brown after introduction of the monomer. |
| 69 | $LiNH_2$ | tetrahydrofurfuryl-CH₂OH | Toluene 39 | 40 | 27 | 1 200 | | | Same. |

EXAMPLES 70–77

The polymerization of αmethylstyrene is carried out under nitrogen from a 10 cc sample at 40° for a period of three hours, utilizing an initiator according to the invention which is formed from $25 \cdot 10^{-3}$ mole of sodium amide and $8.3 \cdot 10^{-3}$ mole of one of the hydroxylated compounds specified in the table.

It is noted that the solution of the initiators in each instance changes color and become orange after the introduction of the monomer, the orange color being characteristic of the α-methyl styryl carbanion.

| Ex. | Hydroxylated Compound | Solvent cc | Yield % | Mn |
|---|---|---|---|---|
| 70 | $C_4H_9(O-CH_2-CH_2)_2OH$ | THF 40 | 63 | 367 |
| 71 | Tetrahydrofurfuryl alcohol | THF 42 | 50 | 670 |
| 72 | $C_4H_9OCH_2CH_2OH$ | THF 38 | 50 | 420 |
| 73 | t-BuOH | THF 41 | 43 | 350 |
| 74 | $C_4H_9(OCH_2CH_2)_2OH$ | Toluene 37 | 64 | 365 |
| 75 | Tetrahydrofurfuryl alcohol | Toluene 40 | 38 | 1 200 |
| 76 | $C_4H_9OCH_2CH_2OH$ | Toluene 41 | 47 | 300 |
| 77 | t-BuOH | Toluene 40 | 57 | 200 |

EXAMPLES 78–85

The polymerization is carried out from parachlorostyrene in the amount of 10 cc under the conditions used in the preceding examples with the initiators in accordance with the invention.

| Ex. No. | Hydroxylated Compound | Solvent cc | Yield % | $\overline{Mn}$ | $\overline{Mp}$ | $\overline{Mp}/\overline{Mn}$ | Observations |
|---|---|---|---|---|---|---|---|
| 78 | $C_4H_9(OCH_2CH_2)_2OH$ | THF 40 | 100 | 69 500 | 286 000 | 4.34 | The solution of the initiator is milky yellow, then the color becomes black after introduction of the monomer. |
| 79 | Tetrahydrofurfuryl alcohol | THF 38 | 100 | 96 000 | 1 562 000 | 16.33 | The solution of the initiator is milky yellow, but the color becomes brown after introduction of the monomer. |
| 80 | $C_4H_9 OCH_2CH_2OH$ | THF 39 | 69 | 320 | | | The initiator solution is milky white but the color changes to brownish-black after introduction of the monomer. |
| 81 | t-BuOH | THF 42 | 40 | 286 | 780 | | Same. |
| 82 | $C_4H_9(OCH_2CH_2)_2OH$ | Toluene 37 | 100 | 408 | | | The solution of the initiator is milky white, but changes to brown black and milky after introduction of the monomer. |
| 83 | Tetrahydrofurfuryl alcohol | Toluene 44 | 100 | 287 | | | The initiator solution is milky white, then the color becomes reddish brown after introduction of the monomer. |
| 84 | $C_4H_9OCH_2CH_2OH$ | Toluene 38 | 40 | 318 | | | The initiator solution is milky white, then the color becomes reddish brown after introduction of the monomer. |
| 85 | tBuOH | Toluene 39 | 38 | 502 | | | Same. |

EXAMPLES 86–93

The following examples illustrate the polymerization of 2-vinyl pyridine from a 10 cc sample with the initiators according to the invention in a reaction time of two hours.

| Ex | Hydroxylated Compound | Solvent cc | Yield % | Mn | Observations |
|---|---|---|---|---|---|
| 86 | $C_4H_9(OCH_2CH_2)_2OH$ | THF 38 | 100 | 5 200 | The solution of the initiator is milky white then the color becomes purple after introduction of the monomer. |
| 87 | Tetrahydrofurfuryl alcohol | THF 41 | 100 | 3 600 | The initiator solution is colorless but then becomes yellow. |
| 88 | $C_4H_9OCH_2CH_2OH$ | THF 40 | 100 | 2 700 | The initiator solution is milky white but then becomes purple after indtroduction of the monomer. |
| 89 | tBu OH | THF 39 | 100 | 2 300 | Same. |
| 90 | $C_4H_9(OCH_2CH_2)_2OH$ | Toluene 37 | 100 | 4 500 | Same. |
| 91 | Tetrahydrofurfuryl alochol | Toluene 38 | 54 | 3 800 | The solution of the initiator is milky white then the color becomes yellow after the introduction of the monomer. |
| 92 | $C_4H_9OCH_2CH_2OH$ | Toluene 40 | 100 | 3 300 | The solution of the initiator is milky white but becomes purple after introduction of the monomer. |
| 93 | tBu OH | Toluene 37 | 100 | 2 700 | Same. |

EXAMPLES 94–99

Examples Nos. 94 and 95 illustrate the polymerization of octene and examples 96 through 99 illustrate the polymerization of ethylene by means of the initiators according to the invention. The amide is sodium amide in the amount of $25 \cdot 10^{-3}$ mole in association with $8.3 \cdot 10^{-3}$ mole of the hydroxylated compound. The polymerization is carried out in atmosphere of argon at 40° C. for a period of three hours, the quantity of the monomer being used in each instance being 10 cc.

| Ex. No. | Hydroxylated Compound | Solvent cc | Yield % | Mn | Observations |
|---|---|---|---|---|---|
| 94 | $C_4H_9(OCH_2CH_2)_2OH$ | THF 41 | 40 | #200 | The initiator solution is milky white, then the color becomes cream. |
| 95 | Tetrahydrofurfuryl alcohol | Toluene 38 | 43 | #200 | The initiator solution is milky white and the color becomes milky yellow after introduction of the monomer. |
| 96 | tBuOH | THF 37 | 10 | 600 | The initiator solution is milky white and no color develops after the introduction of ethylene. |
| 97 | Tetrahydrofurfuryl alcohol | THF 40 | 10 | 100 | Same. |
| 98 | tBuOH | Toluene 40 | 10 | 800 | Same. |
| 99 | Tetrahydrofurfuryl alcohol | Toluene 43 | 10 | 250 | Same. |

EXAMPLE 100

This example illustrates the polymerization of hexamethyl cyclotrisiloxane in the amount of $3.25 \cdot 10^{-2}$ mole under vacuo by means of an initiator prepared from diethylene glycol ethyl ether, the latter in the amount of $1.9 \cdot 10^{-4}$ mole and lithium amide, the latter in the amount of $4.6 \cdot 10^{-4}$ mole. The molecular ratio of the amide to the hydroxylated compound is 2.4.

Tetrahydrofuran in the amount of 3 cc is used as a solvent for the $C_2H_5(OCH_2CH_2)_2OH$. The mixture is allowed to stand under stirring for a period of 12 hours at 20° C. The solvent is then removed by distillation into an attached vessel. Then toluene, in the amount of 16.5 cc is added and the initiator is formed by heating the mixture for a period of two hours at 60° C. The flask is then cooled to room temperature and the monomer is added. The polymerization is allowed to proceed at 25° C. for a period of two days. THF in the amount of 1.75 cc is then added for the purpose of accelerating the propagation. The reaction mixture is allowed to stand 24 hours at 25° C. and it is then heated at 50° for a period of three hours. Finally acetic acid is added for the purpose of terminating the polymerization. The yield of the polysiloxane, precipitated in methanol, after filtration and drying is 39%.

$[\eta]=0.33$ dl/g in toluene at 25° C. Mv=75,000.

EXAMPLE 101

$\epsilon$-caprolactone is polymerized in an atmosphere of nitrogen by means of an initiator system consisting of lithium amide and diethylene glycol monoethyl ether. The amounts used are as follows:

| | |
|---|---|
| $\epsilon$-caprolactone | $3.75 \cdot 10^{-2}$ mole |
| NH$_2$Li | $2.96 \cdot 10^{-3}$ mole |
| C$_2$H$_5$(OCH$_2$CH$_2$)$_2$OH | $8.95 \cdot 10^{-4}$ mole |
| Toluene | 30 cc |

The initiator is prepared by heating at 60° C. for two hours. The temperature is then brought to room temperature, the monomer is added and the mixture is allowed to stand 24 hours at 25° C. The polymerization is terminated by addition of a small quantity of methanol. The yield of the polymer is 45%.

$[\eta]=0.07$ dl/g in benzene at 30° C.

EXAMPLE 102

This example illustrates the polymerization of $\beta$-propiolactone under nitrogen with an initiator system consisting of LiNH$_2$ and $C_2H_5(OCH_2CH_2)_2OH$. The amounts used are as follows:

| | |
|---|---|
| $\beta$-Propiolactone | $6.4 \cdot 10^{-2}$ mole |
| NH$_2$Li | $2.96 \cdot 10^{-3}$ mole |
| C$_2$H$_5$(OCH$_2$CH$_2$)$_2$OH | $8.95 \cdot 10^{-4}$ mole |
| Toluene | 30 cc |

The initiator is prepared as in Example 101 and the polymerization is carried out according to the procedure therein described. The yield of the polymer is 69% after 24 hours at 25° C.

$[\eta]=0.21$ dl/g in CHCl$_3$ at 25° C.

EXAMPLE 103

Pivalolactone is polymerized in an argon atmosphere with a system consisting of sodium amide and tetrahydrofurfuryl alcohol. The amounts of materials used are as follows:

| | |
|---|---|
| Pivalolactone | 0.1 mole |
| NaNH$_2$ | $2.5 \cdot 10^{-2}$ mole |
| Tetrahydrofurfuryl alcohol | $8.3 \cdot 10^{-3}$ mole |
| Toluene | 30 cc |

The initiator is prepared by heating at 45° for a period of three hours. The monomer is introduced into the system cooled at $-40°$ C. Immediately the reaction mixture solidifies. The reaction mixture is allowed to stand five minutes and the reaction is then terminated by addition of 2 cc of methanol.

The yield is quantitative, the melting point is 155° C.

The polymer certainly has a relatively low molecular weight because the melting point reported in the literature is about 245° C.

EXAMPLE 104

Polymerization of propylene sulfide. This polymerization is carried out from 0.13 mole of monomer with a system consisting of sodium amide, $25 \cdot 10^{-2}$ mole and diethylene glycol monobutyl ether, the latter in the amount of $8.13 \cdot 10^{-3}$ mole in the presence of 20 cc of THF in argon atmosphere.

The initiator is prepared by heating at 40° C. for a period of three hours. Polymerization occurs instantaneously at room temperature with a strong evolution of heat. A brown polymer is obtained in quantitative yield. The value of Mn determined osmometrically is as follows:

$50,000 < Mn < 80,000$.

EXAMPLE 105

The same initiator is used for the preparation of the same polymer with the same quantities of materials but in the presence of 20 cc of toluene. The preparation of the initiator is carried out by heating three hours at 45° C. The monomer is introduced into the vessel at a temperature of $-40°$ C. The reaction medium becomes immediately black. After standing two hours at 25° C., the reaction is terminated by addition of $C_2H_5Br$.

The yield is quantitative.

$[\eta]=0.23$ dl/g in benzene at 25° C.

EXAMPLE 106

The polymerization of propylene sulfide in the amount of $5.1 \cdot 10^{-2}$ mole is carried out with an initiator system consisting of $2.1 \cdot 10^{-3}$ mole of sodium amide and $5.2 \cdot 10^{-4}$ mole of diethylene glycol monoethylether in 50 cc of THF in a nitrogen atmosphere. The initiator is prepared by heating at 60° C. for a period of two hours. The polymerization reaction time is 24 hours at 25° C. Yield 72%. Mn (by osmometry) is 90,000.

It should be noted that if the reaction is carried out under similar conditions but without the hydroxylated compound, the yield is much lower after a substantially longer reaction time, that is 72 hours at 25° C. instead of 24 hours at 25° C. In the latter case the yield is 20% and Mn (osmometry) is 49,500.

EXAMPLE 107

The carbonate of 1,3-propanediol 0.1 mole, is polymerized by means of $25 \cdot 10^{-3}$ mole of sodium amide and $8.3 \cdot 10^{-3}$ mole of diethylene glycol monobutyl ether in the presence of 20 cc of THF in an atmosphere of argon. The initiator is prepared by heating at 45° C. for a period of three hours. A gel is formed instantaneously upon introduction of the monomer at 25° C. The reaction is terminated after one hour at 25° C. by addition of 2 cc of methanol. The yield is 100%. M (GPC)=1000.

EXAMPLE 108

Polymerization of the cyclic 2-methyl 2-hydroxymethyl pentanol carbonate is carried out from $6.3 \cdot 10^{-2}$ mole of the monomer by means of an initiator consisting of $2.5 \cdot 10^{-2}$ mole of sodium amide and $8.3 \cdot 10^{-3}$ mole of diethylene glycol monoethyl ether in the presence of 20 cc of THF and in an atmosphere of argon. The initiator is prepared by heating at 45° C. for a period of three hours. Upon addition of the monomer a gel is immediately formed. The reaction is terminated by addition of 2.5 cc of methanol after one-half hour at 25° C. The gel disappears. After standing 48 hours the material forms a gel again. The yield is quantative, the polymer is obtained in the form of white powder of melting point of 54° C. M(GPC)=1425.

EXAMPLE 109

The polymerization of the cyclic carbonate from 2-ethyl 2-hydroxymethyl hexanol, $5.4 \cdot 10^{-2}$ mole, is carried out by means of $2.5 \cdot 10^{-2}$ mole of sodium amide and $8.3 \cdot 10^{-3}$ mole of diethylene glycol monobutyl ether in the presence of 20 cc of THF in an atmosphere of argon. The initiator is prepared by heating at 45° for a period of three hours. A gel is immediately formed upon addition of the monomer at 25° C. The reaction is terminated after one hour at 25° C. The yield is quantative. M(GPC) 1350.

EXAMPLE 110

Propylene oxide in the amount of 0.15 mole is polymerized with the same initiator used in the previous example and the reaction is carried out in the same way. The initiator system and the monomer are allowed to stand at 25° C. After 10 hours a slightly viscous oil is obtained. Yield: 30% Mn=600.

EXAMPLE 111

The polymerization of a mixture of hexamethylcyclotrisiloxane (10 g or $4.5 \cdot 10^{-2}$ mole) and octamethylcyclotetrasiloxane (10 g or $3.4 \cdot 10^{-2}$ mole) is carried out. The initiator is prepared from $2.5 \cdot 10^{-2}$ mole of sodium amide and $8.3 \cdot 10^{-3}$ mole of diethylene glycol monobutyl ether in 20 cc of toluene at 45° C. for a period of three hours. The initiator is then added to the mixture of monomers and the polymerization is allowed to proceed for 10 days at 25° C. The product is a slightly viscous oil suggesting that it consists of oligomers. Yield: 40%; Mn=3600.

EXAMPLE 112

Polymerization of isoprene by means of sodamide and diethylene glycol ethyl ether. Into a flask of 250 cc capacity there is introduced 0.98 g ($25 \cdot 10^{-3}$ mole) finely ground sodium amide, 15 cc of THF and 1.11 g ($8.3 \cdot 10^{-3}$ mole) of diethylene glycol ethyl ether. After letting the mixture stand for a period of two hours at 60° C. under stirring, 15 cc of isoprene are added and the reaction is allowed to proceed for a period of six hours. The polymer is precipitated in methanol, the solvent is then removed and the product is dried under vacuo.

The yield of the reaction is 40%, the polymer having a number average molecular weight Mn=about 2000. The structure of the polymer is as follows:

| | |
|---|---|
| 1.2 | 35% |
| 3.4 | 38% |
| 1.4 | 27% |

EXAMPLE 113

Polymerization of isoprene by means of $NaNH_2$ and diethylene glycol butyl ether.

The initiator is prepared in accordance with Example 112 but the amount of diethylene glycol monobutyl ether is $8.3 \cdot 10^{-3}$ mole. Isoprene, in the amount of 17 cc is added to the initiator and the reaction is allowed to proceed four hours. The polymer is isolated and dried as in Example 1. Mn=800. Yield 45%. The structure consists of 15% 1,4 bonds, 37% 1,2 bonds, 48% 3,4 bonds.

EXAMPLE 114

The polymerization of isoprene by means of sodium amide and glycol monoethyl ether. The initiator is prepared as in the preceding experiment but $8.3 \cdot 10^{-3}$ mole of glycol monoethyl ether is used. At the end of six hours 8 cc of isoprene give a polymer of Mn=500 with 10% yield.

EXAMPLE 115

Polymerization of isoprene by means of sodium amide and triethylene glycol monobutyl ether. There is used $1.3 \cdot 10^{-3}$ mole of triethylene glycol monobutyl ether. At the end of six hours 10 cc of isoprene give a polymer of Mn=1000 with 20% yield.

EXAMPLE 116

Polymerization of isoprene with the system of $NaNH_2$ and tetrahydrofurfuryl alcohol. The initiator is prepared as in previous examples by means of $8.3 \cdot 10^{-3}$ mole of tetrahydrofurfuryl alcohol and 15 cc THF. No color change is noted. At the end of five hours a polymer is obtained.

Mn=700; yield: 15% from 12 cc of isoprene.

EXAMPLE 117

Polymerization of isoprene with the system $NaNH_2$ and diethylene glycol monobutyl ether.

The initiator is prepared in accordance with Example 1 but from $75 \cdot 10^{-3}$ mole of diethylene glycol monobutyl ether and 30 cc of THF. At the end of two hours at 60° C. under stirring, the suspension is allowed to settle for a period of one hour. By means of a hypodermic syringe a sample of 10 cc of the supernatant solution is removed and this supernatant is introduced into a flask containing 20 cc of THF.

The solution is brought to a temperature of 40° C. at which point there is added 10 cc of isoprene. The reaction occurs very rapidly but stirring is continued for a period of two hours. There is obtained a polymer of Mn 5000. Yield: 60%. The polymerization index that is the ratio of Mp/Mn is only about 1.2, while it is in general in the range of 2 in the preceding examples.

To the remainder of the initiator left in the first flask, which comprises some undissolved crystals of sodium amide, there is added 10 cc of isoprene. At the end of two hours there is obtained a polymer of Mn=5000. The yield, however, is 45%.

EXAMPLE 118

Polymerization of isoprene by means of the system $NaNH_2$ and diethylene glycol monoethyl ether.

The initiator is prepared according to the procedure of Example 112 by decreasing the quantity of the solvent and increasing the temperature; only 5 cc of THF are used and the mixture is heated to a temperature of 65° C. At the end of four hours 10 cc of isoprene give a polymer of Mn=800. Yield: 45%.

EXAMPLE 119

Comparative test

An attempt has been made to polymerize 10 cc of isoprene in the presence of lg of sodium amide and 15 cc of THF. After several days during which stirring is continued at a temperature of 30° C., no reaction is noted.

EXAMPLES 120-125

Polymerization of butadiene.

The structure comprises 12% 1,4 bonds and 88% 1,2 bonds.

EXAMPLES 126-133

Polymerization of dimethylbutadiene by means of the system sodium amide, $25 \cdot 10^{-3}$ mole associated with several hydroxylated compounds in the amount of $8 \cdot 10^{-3}$ mole.

An initiator is prepared as described in Example 112. The polymerization is carried out in each instance with 10 cc of the monomer at 40° C., for a period of three hours, in THF (Ex. 126-129) and in toluene (Ex. 130-133).

| Ex. No. | Hydroxylated Compound | Solvent cc | Yield % | Mn | Observations |
|---|---|---|---|---|---|
| 126 | Bu (OCH$_2$CH$_2$)$_2$OH | THF 39 | 51 | 410 | The solution of the initiator is milky white but the color disappears and the solution becomes colorless after introduction of the monomer. |
| 127 | Tetrahydrofurfuryl alcohol | THF 41 | 38 | 280 | The solution of the initiator is milky orange but the color becomes milky yellow after introduction of the monomer. |
| 128 | Bu OCH$_2$CH$_2$OH | THF 43 | 48 | 250 | The solution remains clear yellow after introduction of the monomer. |
| 129 | tBuOH | THF 37 | 34 | 250 | Same. |
| 130 | Bu(OCH$_2$CH$_2$)$_2$OH | Toluene 40 | 30 | 400 | The initiator solution is milky white but becomes yellow after introduction of the monomer. |
| 131 | Tetrahydrofurfuryl alcohol | Toluene 43 | 40 | 300 | The initiator solution is milky white but the color becomes pale yellow after introduction of the monomer. |
| 132 | Bu OCH$_2$CH$_2$OH | Toluene 35 | 31 | 200 | The initiator solution is colorless with the sodamide in suspension but the color becomes gold yellow after introduction of the monomer. |
| 133 | tBuOH | Toluene 40 | 30 | 260 | Same. |

EXAMPLES 134-141

Polymerization of divinylbenzene by means of the system sodium amide ($25 \cdot 10^{-3}$ mole) associated with

| Ex. No. | Initiator | NaNH$_2$ (mole) | Hydroxylated Compound | THF cc | Monomer cc | Duration of reaction in hours | Yield % | Mn |
|---|---|---|---|---|---|---|---|---|
| 120 | NaNH$_2$ and Et (OCH$_2$CH$_2$)$_2$OH | $25.10^{-3}$ | $8,3.10^{-3}$ | 12 | 20 | 3 | 80 | 2 500 |
| 121 | NaNH$_2$ and Me OCH$_2$CH$_2$OH | " | " | 15 | 20 | 4 | 60 | 1 500 |
| 122 | NaNH$_2$ and Bu (OCH$_2$CH$_2$)$_3$OH | " | " | 8 | 20 | 6 | 60 | 2 000 |
| 123 | NaNH$_2$ and Bu (OCH$_2$CH$_2$)$_2$OH | " | " | 15 | 20 | 2 | 85 | 3 000 |
| 124 | NaNH$_2$ and Tetrahydrofurfuryl alcohol | " | " | 10 | 20 | 6 | 55 | 1 200 |
| 125 | NaNH$_2$ and Bu (OCH$_2$CH$_2$)$_2$OH | Supernatant solution | | 10 | 10 | 6 | 90 | 3 200 |

In each of these examples the introduction of butadiene into the flask is carried out by creating a slight vacuum in the reactor. The polymerization occurs at 35° C. In the case of Example 125 the same procedure used in Example 117 is followed. The index of polymerization of the polymer is again in the proximity of 1.2.

several hydroxylated compounds ($8 \cdot 10^{-3}$ mole).

The initiator is prepared as described in Examples 126-133.

The polymerization is carried out from 10 cc of the monomer at 40° C. for a period of three hours. The solvent is THF in Examples 134-137 and toluene in Examples 138-141.

| Ex. No. | Hydroxylated Compound | Solvent cc | Yield % | Mn | Observations |
|---|---|---|---|---|---|
| 134 | Bu (OCH$_2$CH$_2$)$_2$OH | THF 39 | 100 | 600 | The milky white solution of the initiator becomes brown after the introduction of the monomer. |
| 135 | Tetrahydrofurfuryl alcohol | THF 40 | 7 | 480 | Same. |
| 136 | Bu OCH$_2$CH$_2$OH | THF | 41 | 395 | Same. |

| Ex. No. | Hydroxylated Compound | Solvent cc | Yield % | Mn | Observations |
|---|---|---|---|---|---|
| 137 | tBuOH | THF 37 | 100 | 400 | The milky white solution of the initiator becomes yellow after introduction of the monomer. |
| 138 | Bu(OCH$_2$CH$_2$)OH | Toluene 38 | 100 | 440 | The milky white solution of the monomer becomes deep brown after introduction of the monomer. |
| 139 | Tetrahydrofurfuryl alcohol | Toluene 41 | 100 | 460 | Same. |
| 140 | Bu OCH$_2$CH$_2$OH | Toluene 43 | 90 | 410 | Same. |
| 141 | tBuOH | Toluene 37 | 100 | 380 | Same. |
|   |   | 40 |   |   |   |

EXAMPLES 142–152

Polymerization of isoprene by means of sodium amide ($25 \cdot 10^{-3}$ mole) and several hydroxylated compounds ($8 \cdot 10^{-3}$ mole). The polymerization is carried out from 20 cc of the monomer and a total of 20 cc of the solvent indicated in the table below. Polymerization is carried out at a temperature of 60° C. and is stopped at the end of 24 hours. The initiator is prepared in each instance according to the manner of preparation described in Example 14.

| Ex. No. | Hydroxylated Compound | Solvent | Mn | Yield % |
|---|---|---|---|---|
| 142 | C$_2$H$_5$(OCH$_2$CH$_2$)$_2$OH | THF | 3200 | 25 |
| 143 | C$_6$H$_5$—OH | THF | 880 | <10 |
| 144 | (C$_2$H$_5$)$_2$CO | THF | 500 | <10 |
| 145 | C$_6$H$_5$—C(=O)—CH$_3$ | THF | 1500 | <10 |
| 146 | CH$_2$=CH—CH$_2$—OH | THF | 1000 | 30 |
| 147 | 3-(N,N-diethylamino)phenol (OH, Et$_2$N-substituted benzene) | THF | 3500 | <10 |
| 148 | C$_6$H$_5$—OH | Toluene | 1200 | <10 |
| 149 | (C$_2$H$_5$)$_2$CO | Toluene | 1050 | <10 |
| 150 | C$_6$H$_5$—C(=O)—CH$_3$ | Toluene | 800 | <10 |
| 151 | CH$_2$=CH—CH$_2$—OH | Toluene | 1200 | <10 |
| 152 | 3-(N,N-diethylamino)phenol | Toluene | 1500 | <5 |

EXAMPLE 153

Polymerization of isoprene in hexane. The initiator is prepared as described under Example 14 using $25 \cdot 10^{-3}$ mole of sodium amide and $8.3 \cdot 10^{-3}$ mole of tetrahydrofurfuryl alcohol in 10 cc of hexane.

The initiator solution at first is milky white but becomes orange colored after addition of a suspension of 10 cc of the monomer in hexane, the total amount of hexane being 42 cc. At the end of three hours at 40° C. a polymer is obtained. Yield: 32%. Mn=300.

EXAMPLES 154–161

Allyl carbonate and diethylene glycol carbonate (10 cc) are polymerized by means of an initiator according to the invention prepared by association of sodium amide ($25 \cdot 10^{-3}$ mole) and several hydroxylated compounds ($8 \cdot 10^{-3}$ mole) as shown in the table below.

The polymerization is carried out at 40° C. except in Example 156 in which the temperature is 30° C.

| Ex. No. | Hydroxylated Compound | Solvent cc | Reaction time in hours | Yield | Observations |
|---|---|---|---|---|---|
| 154 | Bu(OCH$_2$CH$_2$)$_2$OH | THF 38 | 3 | 67 | The initiator solution is milky white and polymerization is immediate upon introduction of the monomer with color change to orange. Mn = 4700. |
| 155 | Tetrahydrofurfuryl alcohol | THF 42 | 3 | 68 | Same, except that the color change is to yellow; Mn = 5000. |
| 156 | Bu OCH$_2$CH$_2$OH | THF 40 | 3 | 70 | Same, Mn = 2300. |
| 157 | tBuOH | THF 41 | 3 | 53 | Same, Mn = 2900. |
| 158 | Bu(OCH$_2$CH$_2$)$_2$OH | Toluene 43 | instantaneous | 40 | The initiator solution is milky white and polymerization occurs immediately upon introduction of monomer; the product is filtered immediately; yellow color; Mn = 4000. |
| 159 | Tetrahydrofurfuryl alcohol | Toluene 37 | " | 48 | Same, Mn = 3800. |
| 160 | Bu OCH$_2$CH$_2$OH | Toluene 39 | " | 45 | Same, Mn = 1200. |
| 161 | tBuOH | Toluene | " | 62 | Same, except that product is brown. Mn = 1250. |

| Ex. No. | Hydroxylated Compound | Solvent cc | Reaction time in hours | Yield | Observations |
|---|---|---|---|---|---|
| | | 40 | | | |

EXAMPLES 162–164

Vinyl carbonates are polymerized by utilizing the initiators according to the invention.

The initiator is prepared as described previously, at 60° C. by stirring for a period of two hours, from $25 \cdot 10^{-3}$ mole of sodium amide and $8.3 \cdot 10^{-3}$ mole of the hydroxylated compound. In each instance the polymerization occurs instantaneously.

| Ex. No. | Hydroxylated Compound | Solvent | Monomer cc | Temperature | Yield | Mn |
|---|---|---|---|---|---|---|
| 162 | Et (OCH$_2$CH$_2$)$_2$ OH | THF 30 cm3 | Phenyl carbonate and vinyl carbonate | 40° C. | 80% | 360 |
| 163 | Bu (OCH$_2$CH$_2$)$_2$ OH | THF 20 cm3 | Methyl carbonate and vinyl carbonate | 50° C. | 100% | 450 |
| 164 | Bu (OCH$_2$CH$_2$)$_2$ OH | THF 30 cm3 | diethylene carbonate and vinyl carbonate | 30° C. | 100% | 800 |

EXAMPLES 165–172

Acrylonitrile is polymerized by utilizing the initiator according to the invention and specifically $25 \cdot 10^{-3}$ mole of sodium amide and $8 \cdot 10^{-3}$ mole of the hydroxylated compound. Example 165 is a comparative test and no hydroxylated compound is used. It is significant that the yield is only 30% at the end of 30 minutes while in the other examples the reaction is instantaneous and the yield is 100%. The polymerization is carried out at 45° C. except in Example 167 in which the temperature is 40° C.

| Ex. No. | Hydroxylated Compound | Solvent | Monomer cc | Mn | Yield |
|---|---|---|---|---|---|
| 165 | Not used | THF 20 ml | 3 | 5 100 | 30% |
| 166 | tBuOH | THF 30 ml | ·3 | 3 200 | 100% |
| 167 | CH$_3$OCH$_2$CH$_2$OH | THF 30 ml | 5 | 3 000 | 100% |
| 168 | Bu (OCH$_2$CH$_2$)$_3$OH | THF 25 ml | 2 | 2 000 | 100% |
| 169 | Et (OCH$_2$CH$_2$)$_2$OH | THF 25 ml | 2 | 2 500 | 100% |
| 170 | Bu (OCH$_2$CH$_2$)$_2$OH | THF 20 ml | 5 | 2 000 | 100% |
| 171 | Et (OCH$_2$CH$_2$)$_2$OH | Benzene 30 ml | 4 | 2 800 | 100% |
| 172 | Bu (OCH$_2$CH$_2$)$_2$OH | Benzene 40 ml | 5 | 3 000 | 100% |

EXAMPLES 173–181

These examples illustrate the polymerization of methacrylonitrile by means of $25 \cdot 10^{-3}$ mole of sodium amide and $8 \cdot 10^{-3}$ mole of several hydroxylated compounds. Except in Example 173 which is a comparative test, in which no hydroxylated compound is used and in which the yield is only 25% at the end of one hour, all the other polymerizations are instantaneous with a yield of 100%. Polymerization temperature is 45° C.

| Ex. No. | Hydroxylated Compound | Solvent | Monomer cc | Mn | Yield |
|---|---|---|---|---|---|
| 173 | — | THF 25 ml | 5 | 5 000 | 25% |
| 174 | tBuOH | THF | 7 | 7 200 | 100% |
| 175 | CH$_3$OCH$_2$CH$_2$OH | THF 30 ml | 5 | 8 000 | 100% |
| 176 | BuOCH$_2$CH$_2$OH | THF 15 ml | 5 | 4 300 | 100% |
| 177 | Et(OCH$_2$CH$_2$)$_2$OH | THF 15 ml | 10 | 5 000 | 100% |
| 178 | Bu(OCH$_2$CH$_2$)OH | THF 35 ml | 8 | 6 000 | 100% |
| 179 | Tetrahydrofurfuryl alcohol | THF 30 ml | 5 | 3 500 | 100% |
| 180 | Et(OCH$_2$CH$_2$)$_2$OH | Benzene 20 ml | 5 | 2 700 | 100% |
| 181 | Bu(OCH$_2$CH$_2$)$_2$OH | Benzene 50 ml | 7 | 3 400 | 100% |

EXAMPLES 182–184

The polymerization of isoprene, 20 cc is carried out at 40° C. by utilizing potassium amide, KNH$_2$, $25 \cdot 10^{-3}$ mole and an hydroxylated compound, the latter in the amount of $8 \cdot 10^{-3}$ mole. No hydroxylated compound is used in comparative Example 182.

| Ex. No. | Hydroxylated Compound | Solvent | Duration of Reaction | Yield | Mn |
|---|---|---|---|---|---|
| 182 | — | Toluene 20ml | 8 hours | 0% | — |
| 183 | Et(OCH$_2$CH$_2$)$_2$OH | Toluene 20ml | 8 hours | 35% | 800 |
| 184 | tBuOH | THF 40ml | 1½ hours | 47% | 400 |

EXAMPLE 185

Polymerization of ethylene oxide for the initiator is prepared as described in Example 100 from $25 \cdot 10^{-3}$ mole of NaNH$_2$ and $8.3 \cdot 10^{-3}$ mole of diethylene glycol monobutylether in 20 cc of THF. Ethylene oxide, in the amount of 8.5 g is introduced into the suspension and heated for 1½ hours at 30° C. The reaction mixture is then allowed to stand 20 hours at room temperature. The reaction is terminated by means of 1 cc of methanol. The polymer is precipitated in hexane and has Mn=1900. Yield: 30%.

Infrared Analysis Data

The polypropylene oxide prepared as described in Example 110 is examined by infrared analysis. There are noted strong peaks at 1610 cm$^{-1}$ and 3300 cm$^{-1}$ which show the existence of amino and hydroxy groups in the terminal position of the polymer.

What is claimed is:

1. A process of homopolymerization or copolymerization of monomers which are vinyl monomers or dienic monomers capable of undergoing anionic polymerization by opening of an ethylenic double bond in the presence of a solvent and wherein the initiator comprises the product from the association of an alkali metal amide and the salt from at least one compound which is an hydroxylated compound, with the same alkali metal in an aprotic solvent.

2. A process of homopolymerization or copolymerization according to claim 1 wherein the initiator is prepared from an alkali metal amide which is a member selected from the group consisting of sodium amide, lithium amide, and potassium amide and a hydroxylated compound which is a member selected from the group consisting of primary, secondary, and tertiary alcohols.

3. A process of homopolymerization or copolymerization according to claim 1 wherein the initiator consists of the association product of the following compounds:

NaNH$_2$, dodecanol
NaNH$_2$, 2,2-dimethyl propanol
NaNH$_2$, 2-methyl propanol
NaNH$_2$, tetrahydrofurfuryl alcohol
NaNH$_2$, allyl alcohol
NaNH$_2$, 2,6-dimethyl 3-heptanol
NaNH$_2$, isopropanol
NaNH$_2$, neopentyl alcohol
NaNH$_2$, t-butyl alcohol
NaNH$_2$, 2-methyl 2-hexanol
NaNH$_2$, 2-methyl 2-butanol
NaNH$_2$, 5-n-butyl 5-nonanol
NaNH$_2$, 2-methyl cyclohexanol
NaNH$_2$, adamantanol
NaNH$_2$, phenol
NaNH$_2$, diethylaminophenol
NaNH$_2$, 2,5-dimethyl 2,5-hexanediol
NaNH$_2$, ethylene glycol methyl ether
NaNH$_2$, ethylene glycol butyl ether
NaNH$_2$, methoxyphenylmethanol
NaNH$_2$, di(methoxyphenyl) methanol
NaNH$_2$, ethylene glycol phenyl ether
NaNH$_2$, diethylene glycol methyl ether
NaNH$_2$, diethylene glycol ethyl ether
NaNH$_2$, diethylene glycol butyl ether
NaNH$_2$, diethylene glycol phenyl ether
NaNH$_2$, diethylene glycol decyl ether
NaNH$_2$, triethylene glycol ethyl ether
NaNH$_2$, triethylene glycol butyl ether
NaNH$_2$, pentaethylene glycol ethyl ether
NaNH$_2$, hexaethylene glycol ethyl ether
NaNH$_2$, diethyl ketone (enol form)
NaNH$_2$, methylphenyl ketone (enol form)
LiNH$_2$, tetrahydrofurfuryl alcohol
LiNH$_2$, diethylene glycol ethyl ether
KNH$_2$, t-butanol
KNH$_2$, diethylene glycol ethyl ether.

4. The process according to claim 2 wherein said hydroxylated compound is a member selected from the group consisting of an alcohol substituted by a heterocyclic group, alcohols containing the ethylenic unsaturation, alcohols substituted by an aromatic group, alicyclic alcohols, aromatic alcohols, polyhydroxy compounds, ether-alcohols, polyetheralcohols, and enols from ketones and amino acids.

* * * * *